United States Patent [19]
Shaw et al.

[11] Patent Number: 5,900,811
[45] Date of Patent: May 4, 1999

[54] METHOD AND APPARATUS FOR ASSURING MAINTENANCE OF VEHICLE COMPONENTS

[76] Inventors: Daniel C. Shaw; Daniel I. Shaw, both of Geneva, Fla.

[21] Appl. No.: 08/730,703

[22] Filed: Oct. 11, 1996

[51] Int. Cl.$^6$ ................................................ B60Q 1/00
[52] U.S. Cl. .................... 340/457.4; 340/450.3; 340/309.15
[58] Field of Search ............... 340/457.4, 438, 340/450.3, 457, 309.15, 439; 364/424.035

[56] References Cited

U.S. PATENT DOCUMENTS

| | | | |
|---|---|---|---|
| 2,780,692 | 2/1957 | Hinojosa | 340/450.3 |
| 3,098,914 | 7/1963 | Giannino | 340/450.3 |
| 4,404,641 | 9/1983 | Bazarnik | 340/457.4 |
| 5,299,456 | 4/1994 | George | 340/450.3 |
| 5,382,942 | 1/1995 | Raffa et al. | 340/457.4 |
| 5,602,526 | 2/1997 | Read | 340/457 |

*Primary Examiner*—Jeffery A. Hofsass
*Assistant Examiner*—Anh La
*Attorney, Agent, or Firm*—Liniak, Berenato, Longacre & White, LLC

[57] ABSTRACT

The invention is to a method and apparatus for increasing the likelihood that a selected vehicle component has been serviced or checked in a timely manner. An indicator is actuated should the vehicle component not be serviced within a preselected time. The vehicle component is in operable association with a timer, which measures the elapsed time between a starting time and a preselected time. The timer is reset by a switch which is actuated by the servicing of the vehicle component. Should the timer reach a preselected time before the switch associated is actuated, then an indicator is actuated.

22 Claims, 2 Drawing Sheets

METHOD AND APPARATUS FOR ASSURING MAINTENANCE OF VEHICLE COMPONENTS

FIELD OF THE INVENTION

This invention generally relates to a method and apparatus for increasing the likelihood that a selected vehicle component has been serviced or checked in a timely manner. More particularly, the invention is to a method and apparatus by which servicing of the vehicle component actuates a switch which resets a timer. Should the timer attain a predetermined elapsed time before the component is serviced, then an indicator is actuated.

BACKGROUND OF THE INVENTION

It is important that certain vehicle components be regularly serviced in order to maintain proper functioning of the vehicle. For instance, the oil of a vehicle should be regularly checked for sufficient supply. If the oil is not checked regularly, then the engine may be damaged. Additionally, other vehicle components should be regularly checked and serviced, such as transmission fluid, washer fluid, differential fluid, etc.

In the past, systems have been developed to indicate that a vehicle component is due for maintenance. Such systems include means for manually entering in a maintenance time. Run time meters have been used to measure the time when a component needs to be serviced. Should the preselected time be reached, then a warning system may be actuated indicating that the vehicle component needs to be serviced. Similarly, computer systems have been used to more effectively determine the time when service of the vehicle component is needed. After the preselected time is reached, then an indicator may be actuated, typically in a way that it may only be viewed by the operator of the vehicle. A problem incurred by these systems is that vehicle operator may ignore the warning indicators.

Particularly in the trucking industry, the owner frequently depends upon the truck driver to regularly service the truck. Unfortunately, some truck drivers ignore the alarm, actuator, indicator, light, etc. which indicates that a particular component needs to be serviced. In order to become aware of the problem, the owner must enter the vehicle and often times start the engine to determine whether the component needs maintenance. Moreover, even if the operator responds to the actuator, the maintenance interval has already elapsed.

It is known to monitor the oil level by electronic means attached to the dipstick. When the oil level reaches a low point, a light may be actuated to alert the operator that oil needs to be replenished. Again, these warnings are often ignored by the operator. Additionally, there is no guarantee that the operator has checked and/or replenished the oil. Rather, these systems measure the oil level, not the time elapsed between consecutive oil checks.

In view of the above, those skilled in the art will understand that there is a need for a method and apparatus which will increase the likelihood that a vehicle component has been serviced in a timely manner. The disclosed invention meets these needs through a system and method which directs a party responsible for the maintenance of such components to the site of the vehicle component, in order to avoid operation of the external indicator which will inform the owner or other concerned party that the vehicle component has not been checked. This increases the likelihood that the vehicle component will actually be serviced. Importantly, this invention puts the parties responsible for maintenance of the components on notice that the vehicle owner or manager is monitoring such maintenance. Thus, the parties responsible for the maintenance will have more incentive to check the component. Additionally, because the system can only be reset by going to the site of the component and actuating the switch, chances are the responsible party will more than likely check the component.

SUMMARY OF THE INVENTION

A principal object of the present invention is to provide a system and method for increasing the likelihood that a particular vehicle component is checked during a specified period of time.

It is yet a further object of the present invention to provide a system in which the owner/manager of the vehicle can more easily detect whether a vehicle component has been regularly serviced.

The above objects are achieved according to the present invention. A vehicle includes an engine which has a vehicle component which needs periodically to be serviced. A timer is associated with the vehicle component for monitoring the elapsed time between service events. An indicator is operably associated with the timer for being actuated by the timer upon a preselected time being achieved. A switch is proximate to and activated upon service of the vehicle component. The switch is actuated upon service of the vehicle component and causes the timer to be reset so that the indicator is not actuated.

A method for increasing the likelihood that a vehicle component has been serviced comprises the steps of providing a serviceable vehicle component operably associated with a switch, monitoring with a timer the time elapsed between a starting time and a preselected time, and resetting the timer through actuation of the switch prior to achieving the preselected time or alternatively actuating the indicator should the preselected time be achieved.

A feature of the system and method is that the timer system is reset by servicing of the vehicle component. This increases the likelihood that the parties responsible for maintenance of the vehicle will service the selected component before the indicator is operated. This system will give the responsible parties incentive to check the vehicle component, because otherwise a light will indicate to the owner/manager that the component has not been timely serviced.

These and other objects and advantages of the invention will be readily apparent in view of the following description and drawings of the above-described invention.

DESCRIPTION OF THE DRAWINGS

The above and other objects and advantages and novel features of the present invention will become apparent from the following detailed description of the preferred embodiment of the invention illustrated in the accompanying drawings, wherein.

DESCRIPTION OF THE INVENTION

Figure 1:
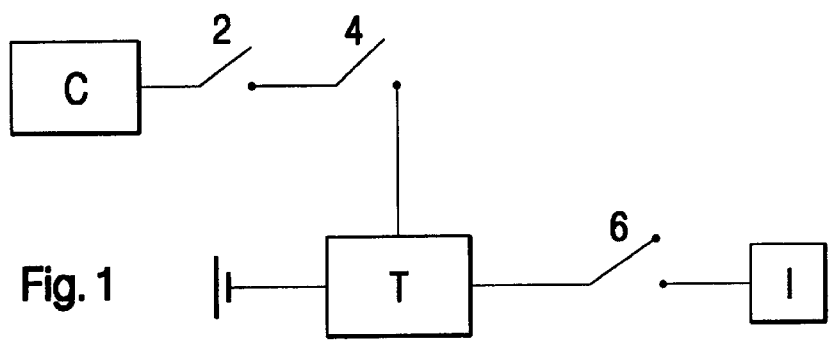
FIG. 1 is the schematic diagram of the circuitry of the invention.

The basic schematic of this invention is best shown in FIG. 1. Vehicle component C is operably associated with timer T, such that servicing of the vehicle component C actuates switches 2 and 4 which reset timer T. In the preferred embodiment, the vehicle component is an oil dipstick, but can be any vehicle component which requires regular maintenance.

In order for timer T to be reset, switch 2 and switch 4 must both be actuated. This occurs when the dipstick is twice removed from the tube, each removal causing one of the switches to be actuated or closed. Switch 2 is a normally open switch which is closed as a result of the dipstick being first removed from the tube. Switch 4 is a normally open switch which is closed as a result of the dipstick being twice removed from the tube. When checking the oil level, the dipstick typically is removed, cleaned, and then re-inserted. After the dipstick is re-inserted, it is again removed to check the oil level. Thus, proper checking of the oil requires that the dipstick be removed twice from its surrounding sleeve. Timer T can only be reset if both switches 2 and 4 are closed. The switches are closed by removal of the dipstick, so two removals are required in order to cause both switches to be closed. This improves the likelihood that the component has been serviced, because it requires the dipstick to be removed twice before the timer T is reset. The timer T may have an internal auxiliary timer which monitors the time required for switches 2 and 4 to both close, because they should normally close in a relatively short elapsed time when the oil is checked. Thus, simply lifting the dipstick on two widely spaced occasions will not be sufficient to reset timer T.

Timer T includes switch 6 which is actuated when timer T reaches the preselected time. Switch 6 is a normally open switch which closes when timer T reaches that preselected time. The preselected time can be manually or otherwise set in timer T. Should the preselected time elapse before the vehicle component is serviced, then switch 6 is closed and actuates indicator I. Indicator I contains a separate electrical power supply to maintain operation of the indicator I even when the vehicle is not in service. Indicator I should be located on a part of the vehicle in which it can be easily discerned, preferably on the outside of the vehicle. In the preferred embodiment, indicator I is located on the grill of the vehicle. This permits interested parties to easily discover if the party responsible for maintenance has checked the vehicle component within the specified time period. Indicator I can be anything which is capable of alerting that the vehicle component has not been checked, such as a light, siren, LED, or the like. After indicator I is operated, the system can be reset by servicing of the vehicle component.

This invention requires that the parties responsible for maintenance of the vehicle trigger the switch located at the vehicle component C within a preselected period of time. If the responsible party checks the vehicle component C before the time has elapsed, the timer T is reset. If the preselected time elapses before the responsible party services the component, the indicator I is operated. Unlike other systems, this invention is reset at the site of the vehicle component, which increases the likelihood that the component will actually be serviced. Additionally, it puts the responsible parties on notice that the owner/manager is monitoring maintenance. This adds another incentive to check and service the vehicle component. The time monitored by timer T may be running time or actual elapsed time.

Figure 2:
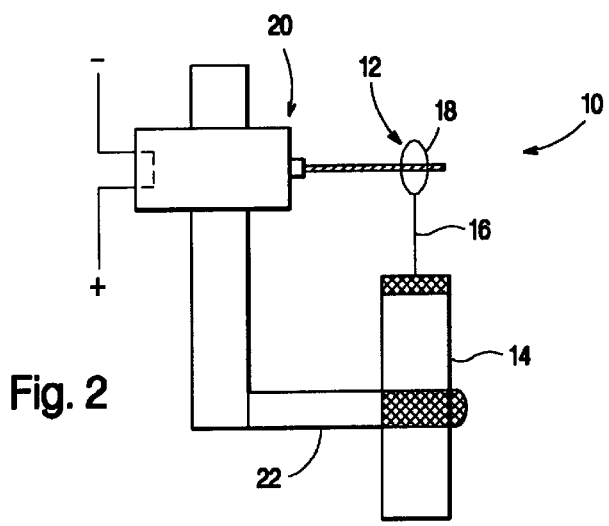
FIG. 2 is a fragmentary elevational view of an embodiment.

FIG. 2 is a fragmentary elevational view of a preferred embodiment. Vehicle component C is a dipstick assembly 10 which is used to check the oil supply. Dipstick assembly 10 is the typical kind found in vehicles, with dipstick 12 and tube 14. Dipstick 12 includes flexible shaft 16 and manually engageable ring 18 which enables removal of dipstick 12.

Switch 20 is actuated so that its contacts close by the removal of dipstick 12 through use of manually engageable ring 18. Switch 20 may be any switch, such as a whisker switch or reed switch, which can be actuated by removal of the dipstick 12 from tube 14. Switch 20 is in electrical connection with timer T, so that the actuations of switch 20 closes its contacts and causes timer T to be reset. Timer T is connected to indicator I such that should timer T reach a preselected time, then indicator I is actuated. Switch 20 is mounted to tube 14 by bracket 22.

Figure 3:
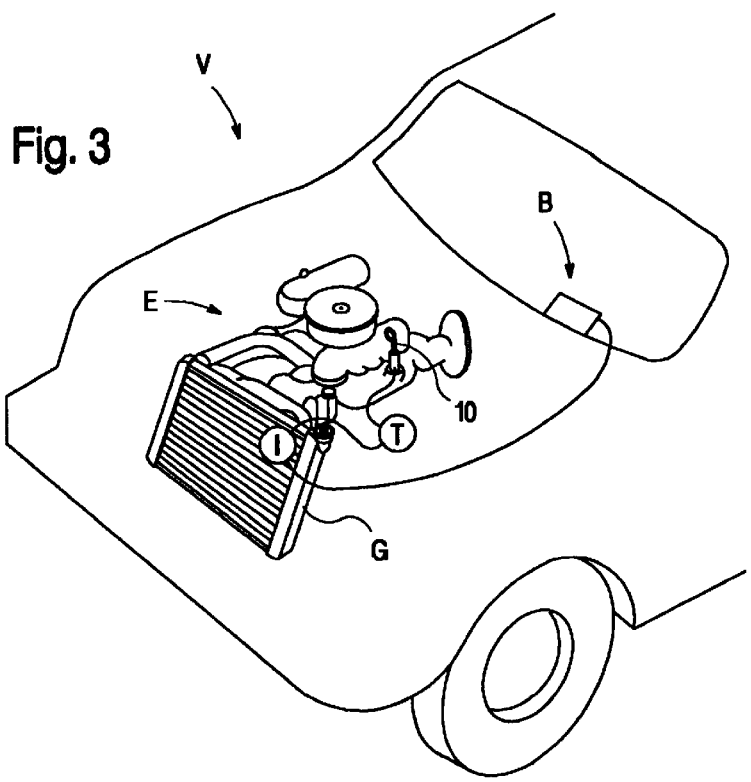
FIG. 3 is a perspective view of the invention.

FIG. 3 is a fragmentary perspective view of the invention. Vehicle V has an engine E and a grille G. In the preferred embodiment, dipstick assembly 10 is connected to timer T, such that removal of dipstick 12 resets timer T after both switches 2 and 4 have been closed. Those skilled in the art recognize that electronic timers may be used, such as provided by microprocessors, instead of an analog timer T. Timer T either continually runs or runs only during operation of the vehicle. Timer T can be set for closing switch 6 after any set elapsed time, preferably at a time which is indicative of when the oil should be checked. The timer T may allow the owner to determine the preselected time. If timer T attains the preselected elapsed time, indicator I is operated. Indicator I is connected to buzzer B such that when indicator I is operated, buzzer B is operated alerting the operator of the vehicle that the oil needs to be checked.

While we prefer the use of switches 2 and 4 for resetting timer T, the invention may be implemented through a single one of those switches. The switches 2 and 4 are used to more realistically monitor the typical steps used to check the oil. Should a single switch be used instead of dual switches, then the timer T is reset by a single removal of the dipstick 12 from the tube 14, without assurance that the oil was in fact checked. Even with the single switch, however, the person actuating the switch must approach the dipstick assembly 10, thus increasing the likelihood that the oil has been checked.

Also, while we illustrate switches 2 and 4, those skilled in the art will recognize that a single switch may be used, provided that there is a counter monitoring how many times in a given period the switch is closed. Closing and opening the switch within a predetermined period, such as within one minute, may be used to indicate that the dipstick 12 has twice been removed from tube 14. That procedure and time would normally occur when the oil is being checked.

Figure 4:
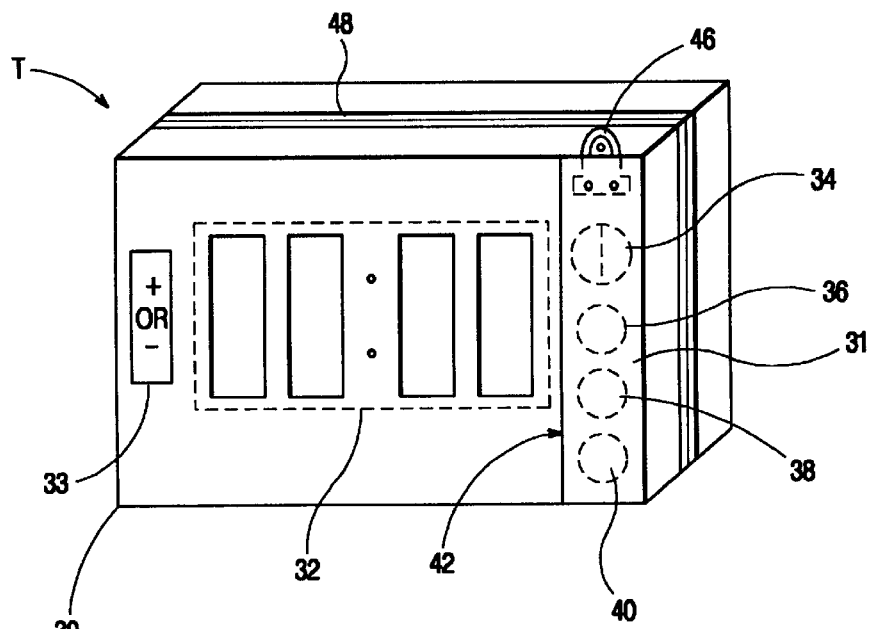
FIG. 4 is a perspective view of a timer T for use with the invention.

A perspective view of the preferred embodiment of timer T is best shown in FIG. 4. Timer T is a digital timer with a front display 30. Front display 30 includes control panel 31, digital screen 32, and sign indicator 33. Digital screen 32 displays the preselected time in hours and minutes. Control panel 31 includes slot 34 to adjust the hour display, slot 36 to adjust the minute display, slot 38 to lock the set time in digital screen 32, and slot 40 to control the mode adjustment. Slots 34, 36, 38, and 40 are operated with a screwdriver having a common head. Backing 42 covers control panel 31 and is secured by lock 46 to prevent tampering with the set conditions. Once control panel 31 has been set, sign indicator 33 displays the time remaining to check the oil before indicator I is operated, or how long the responsible party has ignored indicator I. If sign indicator 33 shows a positive (+) sign, the time displayed on digital screen 32 indicates the time remaining before indicator I is operated. A negative sign (−) indicates the length of time the responsible party has been neglecting to check the oil. Sign indicator 33 will be negative when indicator I is operated.

In the back of timer T is a battery such that if the operator of the vehicle decides to cut the wires from the battery to the timer, the backup battery will begin to power the timer. The backup battery is enclosed by a backing which is secured by lock 46 and seal 48. If seal 48 becomes broken, this would indicate that the reading on timer T may be inaccurate.

Figure 5:
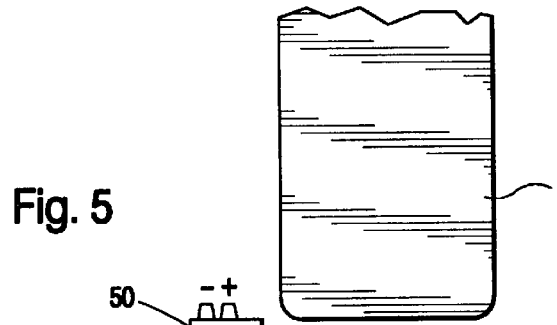
FIG. 5 is a fragmentary elevational view partially in schematic and cross section of a second embodiment of the invention.

FIG. 5 discloses a second embodiment of the invention in which the switch 20 of FIG. 2 is replaced with lever switch 50. Lever switch 50 has a contact housing 52 and electrical connector 54 for connection to power supply plug 56. Pivotal level 58 is connected at 60 to switch 50, and is disposed within tube 14 of dipstick assembly 10. Lever 58 is biased into the position of FIG. 5 in which the lever extends into tube 14, so that it may be engaged by shaft 16. Thus, when shaft 16 is lowered into tube 14, then lever 58 is engaged and pivoted in the direction of arrow 62 for causing opening of the contacts on switch 50. When shaft 16 is removed, then the contacts on the switch 50 close.

While this invention has been described as having a preferred design, it is understood that it is capable of further modifications, uses, and/or adaptations of the invention following the general principle of the invention and including such departures from the present disclosure as come within known or customary practice in the art to which the invention pertains, and as may be applied to the central features hereinbefore set forth, and fall within the scope of the invention of the limits of the appended claims.

What we claim is:

1. A vehicle, comprising:
   a. an engine including a vehicle component to be serviced;
   b. a timer for monitoring the elapsed time between a starting time and a preselected time;
   c. an externally perceivable indicator operably associated with said timer for being operated by said timer upon the preselected time being attained; and
   d. a switch proximate to and activated upon service of the vehicle component, actuation of said switch causing said timer to be reset to the starting time.

2. The vehicle as recited in claim 1, wherein said indicator is a light.

3. The vehicle as recited in claim 2, wherein said indicator is located on an exterior portion of the vehicle.

4. The vehicle as recited in claim 3, including means for maintaining the operation of said indicator.

5. The vehicle as recited in claim 1, further comprising an audio alert device, said audio alert device is operably associated with said indicator for being operated when said indicator is operated.

6. The vehicle as recited in claim 1, wherein the time elapsed between the starting time and the preselected time is the running time of the engine.

7. The vehicle as recited in claim 5, including means associated with the vehicle for operating said timer.

8. The vehicle as recited in claim 1, wherein the serviceable vehicle component is a dipstick.

9. The vehicle as recited in claim 1, wherein actuation of said switch occurs as a result of the dipstick being twice removed.

10. The vehicle as recited in claim 1, wherein the timer includes a microprocessor.

11. An apparatus for increasing the likelihood that a vehicle component will be serviced in a timely manner, comprising:

a. a timer for monitoring the elapsed time between a starting time and a preselected time;
   b. an externally perceivable indicator operably associated with said timer for being operated by said timer upon achieving the preselected time; and
   c. a switch proximate to and activated upon service of a vehicle component, actuation of said switch causing said timer to be reset to the starting time.

12. The apparatus as recited in claim 11, wherein said indicator is a light.

13. The apparatus as recited in claim 12, wherein said indicator is located on an exterior portion of the vehicle.

14. The apparatus as recited in claim 13, including means for maintaining the operation of said indicator.

15. The apparatus as recited in claim 14, wherein the time elapsed between the starting time and the preselected time is the running time of the engine.

16. The apparatus as recited in claim 15, including means associated with the vehicle for operating said timer.

17. The apparatus as recited in claim 16, wherein the serviceable vehicle component is a dipstick assembly.

18. The apparatus as recited in claim 17, wherein said switch is actuated upon the dipstick being twice removed in a predetermined period.

19. The apparatus as recited in claim 11, wherein the timer includes a microprocessor.

20. A method for increasing the likelihood that a vehicle component is serviced in a timely manner, comprising the steps of:

a. providing a serviceable vehicle component operably associated with a switch;
   b. monitoring with a timer the time elapsed between a starting time and preselected time; and
   c. resetting the timer by actuation of the switch prior to achieving the preselected time or alternatively causing an externally perceivable indicator to operate should the preselected time be achieved.

21. A vehicle, comprising:
   a. an engine including a vehicle component to be serviced;
   b. a timer for monitoring the elapsed time between a starting time and a preselected time;
   c. an externally perceivable indicator operably associated with said timer for being operated by said timer upon the preselected time being attained; and
   d. a switch proximate to and activated upon service of the vehicle component, actuation of said switch causing said timer to be reset to the starting time, wherein actuation of said switch occurs as a result of the dipstick being twice removed.

22. An apparatus for increasing the likelihood that a vehicle component will be serviced in a timely manner, comprising:
   a. a timer for monitoring the elapsed time between a starting time and a preselected time;
   b. an externally perceivable indicator operably associated with said timer for being operated by said timer upon achieving the preselected time; and
   c. a switch proximate to and activated upon service of a vehicle component, wherein said switch is actuated and said time thus reset upon the dipstick being twice removed in a predetermined period.

* * * * *